(12) United States Patent
Lee et al.

(10) Patent No.: US 7,440,406 B2
(45) Date of Patent: Oct. 21, 2008

(54) APPARATUS FOR DISPLAYING NETWORK STATUS

(75) Inventors: Hee-Jo Lee, Seoul (KR); Hyo-Gon Kim, Seoul (KR); Sae-Woong Bahk, Seoul (KR)

(73) Assignee: Korea University Industry & Academy Cooperation Foundation, Seoul (KR)

( * ) Notice: Subject to any disclaimer, the term of this patent is extended or adjusted under 35 U.S.C. 154(b) by 672 days.

(21) Appl. No.: 11/025,722

(22) Filed: Dec. 29, 2004

(65) Prior Publication Data

US 2006/0140127 A1 Jun. 29, 2006

(51) Int. Cl.
*G01R 31/08* (2006.01)
*G06T 15/00* (2006.01)
*G06F 11/00* (2006.01)

(52) U.S. Cl. .......................... 370/241; 345/419; 714/38

(58) Field of Classification Search ................. 345/419; 714/38, 47, 48, 57, 46; 713/201, 188
See application file for complete search history.

(56) References Cited

U.S. PATENT DOCUMENTS 6,253,337 B1 *  6/2001  Maloney et al. ................ 714/38
6,906,709 B1 *  6/2005  Larkin et al. ................. 345/419

OTHER PUBLICATIONS

A Visualization Paradigm for Network Intrusion Detection, Proceeding of the 2005 IEEE, Yarden Livat et al.*

* cited by examiner

*Primary Examiner*—Huy D. Vu
*Assistant Examiner*—David Oveissi
(74) *Attorney, Agent, or Firm*—IPLA P.A.; James E. Bame

(57) ABSTRACT

An apparatus for displaying network status includes a network traffic collection unit, a network status display unit and a first attack type determination unit. The network traffic collection unit analyzes packets collected from an external communication network, and outputs connection information including a source Internet Protocol (IP) address, a destination IP address and a destination port number. The network status display unit receives the connection information transmitted from the network traffic collection unit for a predetermined period, and displays the connection information in a coordinate point data form on a three-dimensional rectangular coordinate system whose three axes are assigned to a source IP address, a destination IP address and a destination port number, respectively. The first attack type determination unit detects the coordinate point data displayed on the network status display unit as a line or plane through image processing, and determines an attack type according to the type of the line or plane.

10 Claims, 9 Drawing Sheets

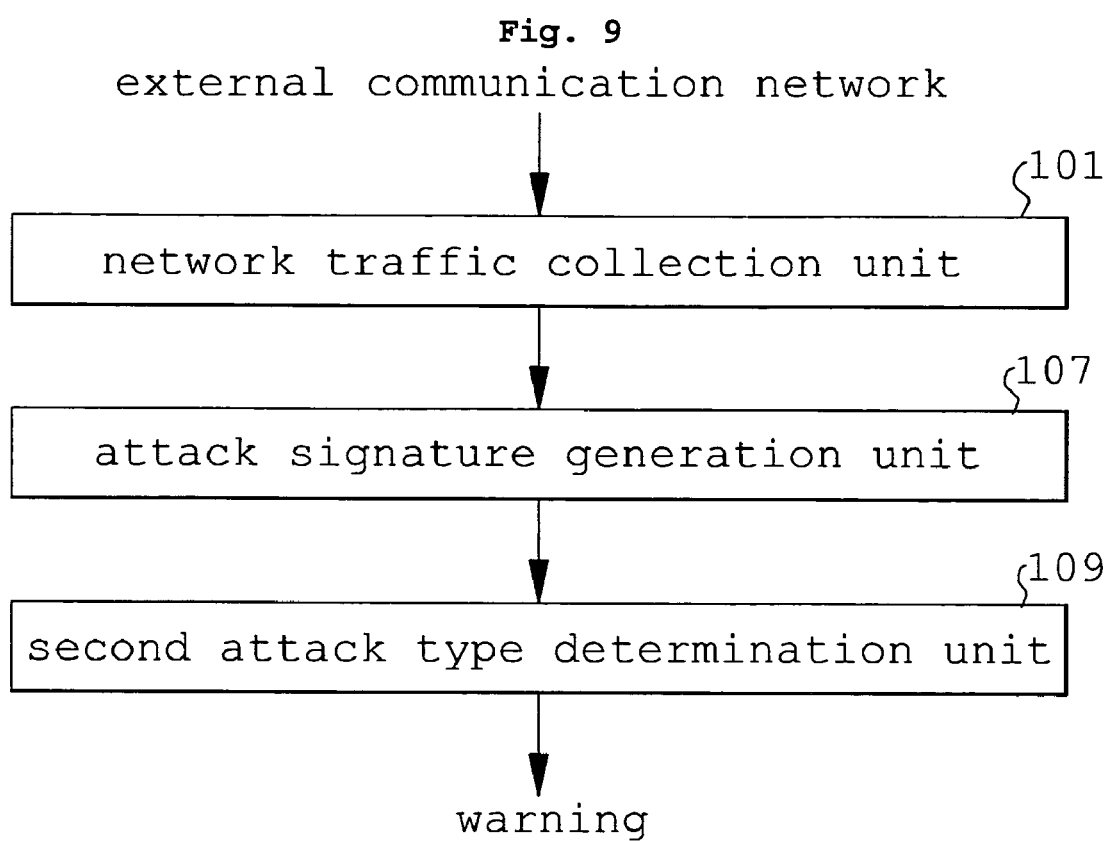

APPARATUS FOR DISPLAYING NETWORK STATUS

BACKGROUND OF THE INVENTION

1. Field of the Invention

The present invention relates generally to an apparatus for displaying network status and, more particularly, to an apparatus for displaying network status, which analyzes the validity and illegality of packets flowing from an external information communication network by analyzing connection information in the headers of the packets, and enables current network status to be easily detected by detecting traffic patterns that cause abnormal situation in an internal network.

2. Description of the Related Art

Recently, various network-related technologies and applications are being developed. As such a network becomes a core part of a networking technology field, agents for controlling and managing the network, which is an aggregate of heterogeneous apparatuses, are required. However, illegal access to such agents can destroy the security of companies. In order to protect the security of companies or other networks from external attacks, many technologies, such as intrusion detection, intrusion blocking, back-tacking and virus protection, are required according to the characteristics of networks.

However, methods of monitoring and controlling abnormal network status have detected such abnormal network status by examining only a specific element of collected network traffic information, or do not consider the relationships between various elements even though examining the elements.

As an example, there is a method of analyzing network traffic status in which abnormal attack status is detected using the ratio of the number of packets flowing into a network and the number of packets flowing out of the network. In this case, the method is disadvantageous in that a large amount of packet information is required to determine network status to be a scanning attack.

As another example, there is a method of analyzing network traffic status in which the amount of traffic for each of the source addresses, destination addresses and port numbers of packets is measured. This method is problematic in that an attack type cannot be accurately determined because the relationship between the results of the measurement is not considered.

SUMMARY OF THE INVENTION

Accordingly, the present invention has been made keeping in mind the above problems occurring in the prior art, and an object of the present invention is to provide an apparatus for displaying network status, which displays the traffic status of a network in a three-dimensional form using a source address, a destination address and a destination port number, or enables the occurrence and type of an attack to be simply detected by generating an attack signature for displaying the possibility of an attack for each of packets.

In order to accomplish the above object, the present invention provides an apparatus for displaying network status, including a network traffic collection unit for analyzing packets collected from an external communication network and outputting connection information including a source Internet Protocol (IP) address, a destination IP address and a destination port number; a network status display unit for receiving the connection information transmitted from the network traffic collection unit for a predetermined period and displaying the connection information in a coordinate point data form on a three-dimensional rectangular coordinate system whose three axes are assigned to a source IP address, a destination IP address and a destination port number, respectively; and a first attack type determination unit for detecting the coordinate point data displayed on the network status display unit as a line or plane through image processing and determining an attack type according to the type of the line or plane.

In order to accomplish the above object, the present invention provides an apparatus for displaying network status, including a network traffic collection unit for analyzing packets collected from an external communication network and outputting connection information formed of elements including source IP addresses, destination IP addresses and destination port numbers; an attack signature generation unit for receiving the connection information on a packet transmitted from the network traffic collection unit, determining whether the elements of the connection information match corresponding elements of connection information on packets that are collected during a period between a collection time of the transmitted packet and a time ahead of the collection time by a predetermined period, and generating an attack signature for indicating whether the elements of the transmitted packet matching the corresponding elements exist; and a second attack type determination unit for analyzing the attack signature of the packet and determining an attack type of the packet according to the attack signature.

BRIEF DESCRIPTION OF THE DRAWINGS

The above and other objects, features and advantages of the present invention will be more clearly understood from the following detailed description taken in conjunction with the accompanying drawings, in which:

FIG. 9 is a diagram showing the construction of an apparatus for displaying network status according to a second embodiment of the present invention.

DESCRIPTION OF THE PREFERRED EMBODIMENTS

Figure 1:
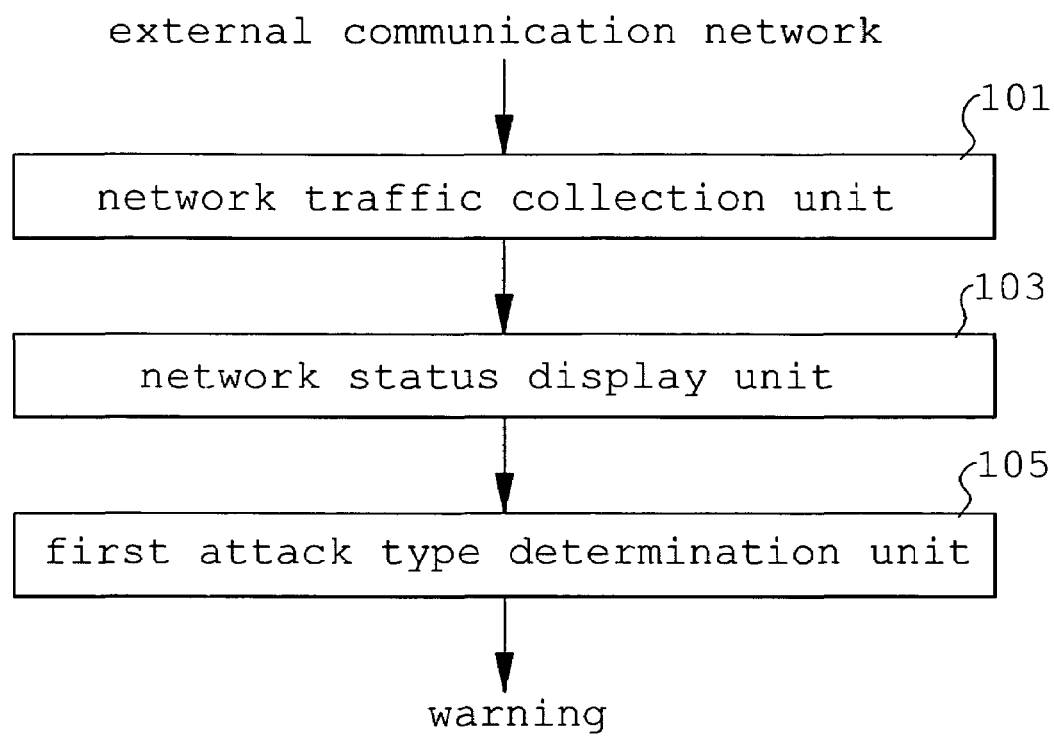
FIG. 1 is a diagram showing the construction of an apparatus for displaying network status according to a first embodiment of the present invention.
Figure 2:
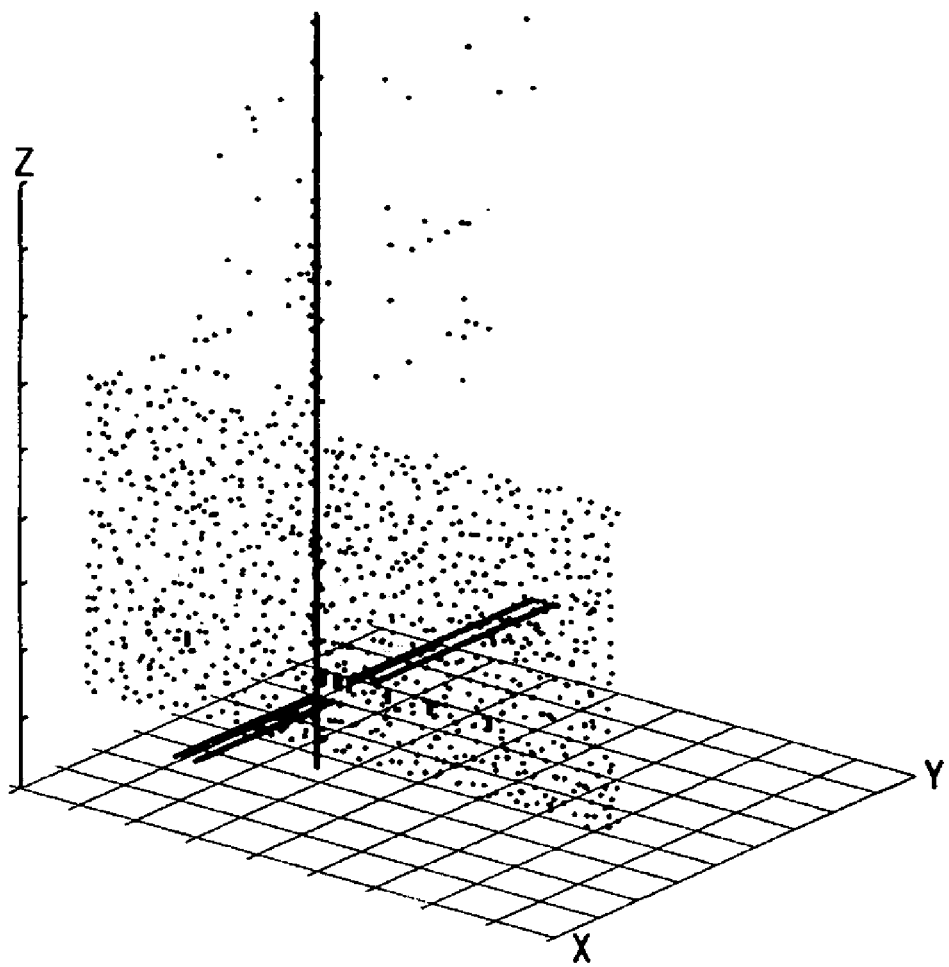
FIG. 2 is a graph showing the situation of the network traffic of FIG. 1.

Reference now should be made to the drawings, in which the same reference numerals are used throughout the different drawings to designate the same or similar components.

Embodiments of the present invention are described in detail below.

FIG. 1 is a diagram showing the construction of an apparatus for displaying network status according to a first embodiment of the present invention. Referring to FIG. 1, the apparatus for displaying network status according to the first embodiment of the present invention includes a network traffic collection unit 101, a network status display unit 103 and a first attack type determination unit 105.

The network traffic collection unit 101 analyzes packets collected from an external communication network (not shown), that is, an accessing network, and outputs connection information. In other words, the network traffic collection unit 101 extracts a packet collection time, a source IP address, a destination IP address and a destination port number from each of the headers of the packets during the session of a Transmission Control Protocol/Internet Protocol (TCP/IP) or User Datagram Protocol (UDP) communication network on which two-way communication can be performed, and then outputs the connection information. The connection information includes the source IP address, the destination IP address and the destination port number.

The network status display unit 103 receives the connection information transmitted from the network traffic collection unit 101 for a predetermined period (set to 1 second to 1 minute based on network speed), and displays the connection information in a coordinate point data form on a three-dimensional rectangular coordinate system whose three axes are assigned to a source IP address, a destination IP address and a destination port number, respectively.

The first attack type determination unit 105 detects the coordinate point data displayed on the network status display unit 103 as a line or plane through general image processing, and determines an attack type according to the type of the line or plane. Although the first attack type determination unit 105 is constructed to determine the attack type using the image processing in the first embodiment of the present invention, the first attack type determination unit 105 can be constructed to determine the attack type using various processors to increase the accuracy of the determination of the attack type.

That is, when the source IP address and the destination port number are fixed and the destination IP address is variable, the coordinate point data are represented by a line on the three-dimensional rectangular coordinate system, and the attack type is determined to be a host scanning attack. When the source IP address and the destination IP address are fixed and the destination port number is variable, the coordinate point data are represented by: a line on the three-dimensional rectangular coordinate system, and the attack type is determined to be a port scanning attack.

Furthermore, when the destination port number and the destination IP address are fixed and the source IP address is variable, the coordinate point data are represented by a line on the three-dimensional rectangular coordinate system, and the attack type is determined to be a source-spoofed DoS attack, which uses source IP address spoofing, on the specific port of a specific destination IP address.

Furthermore, when the destination IP address is fixed and the source IP address and the destination port number are variable, the coordinate point data are represented by a plane on the three-dimensional rectangular coordinate system, and the attack type is determined to be a source-spoofed DoS attack, which uses source IP address spoofing, on a specific destination IP address.

Figure 3:
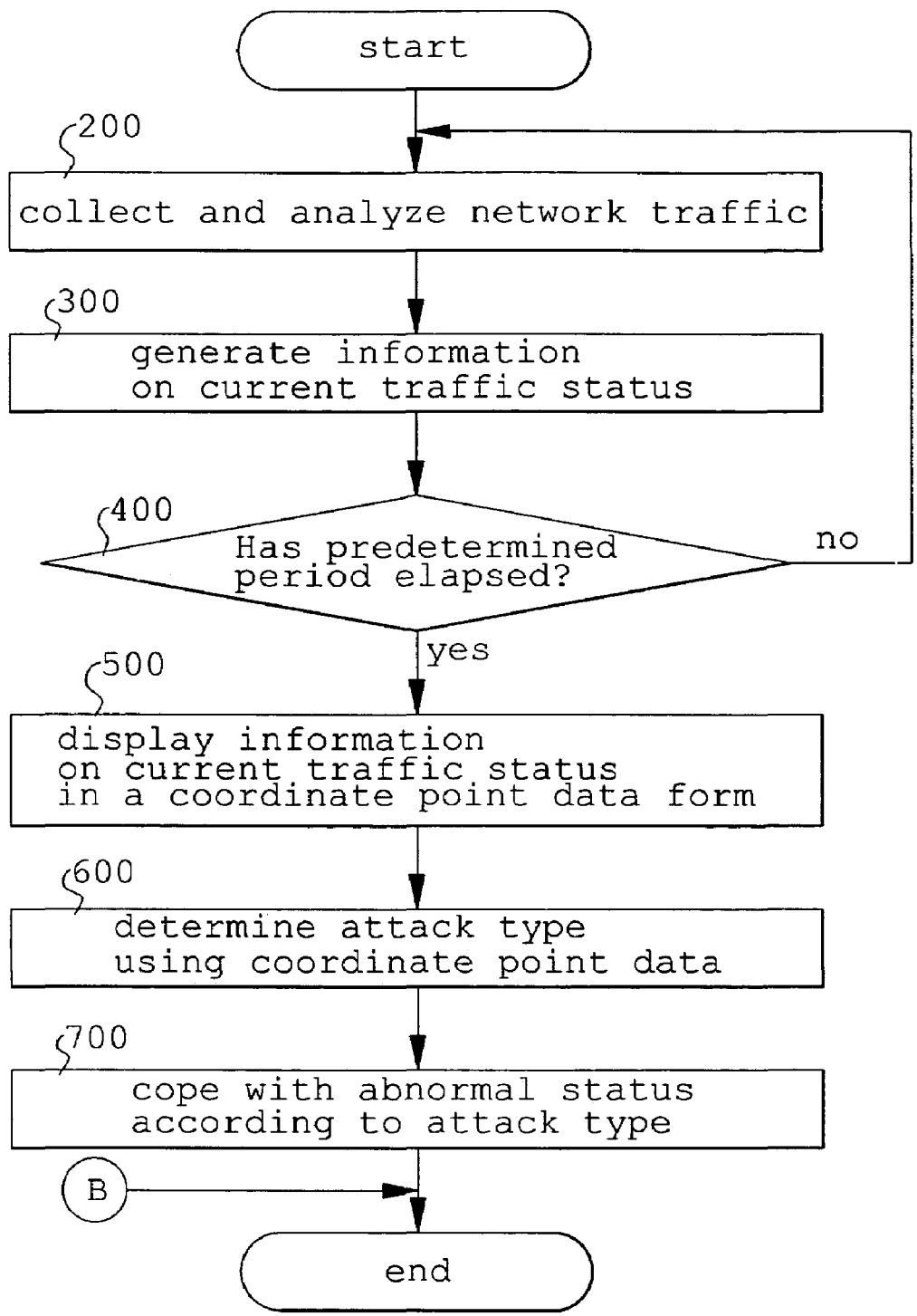
FIG. 3 is a flowchart showing a process of displaying the network status according to the first embodiment of the present invention.

FIG. 3 is a flowchart showing a process of displaying the network status according to the first embodiment of the present invention.

In FIG. 3, packets, which have passed through an external communication network (not shown), are collected and classified according to status at step 200. Status information on the packets collected at step 200 is collected and the statistical processing and pattern analyses are performed on the collected status information, and connection information on current traffic situation is extracted at step 300. Thereafter, it is determined whether a predetermined period has elapsed at step 400. If it is determined that the predetermined period has elapsed (i.e., it is determined that complete traffic information has been collected for the predetermined period), the connection information on the traffic situation is represented by coordinate point data at step 500.

After the connection information is represented by the point data on the coordinate system through step 500, an attack type is determined using the coordinate point data at step 600. A policy according to the determined attack type is employed, and the normal traffic situation is restored at step 700.

Figure 4:
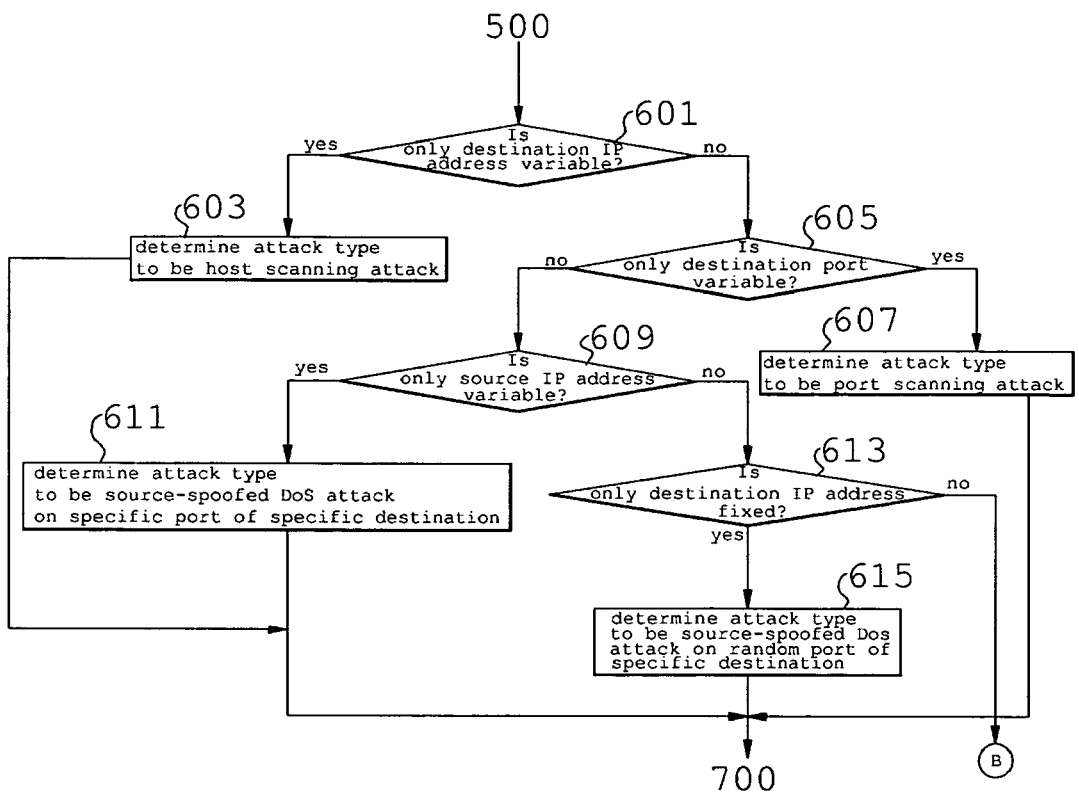
FIG. 4 is a flowchart showing the attack type determination step of FIG. 3.

FIG. 4 is a flowchart illustrating the step 600 of determining an attack type. FIGS. 5 to 8 are graphs showing coordinate point data according to the attack types of FIG. 4.

Figure 5:
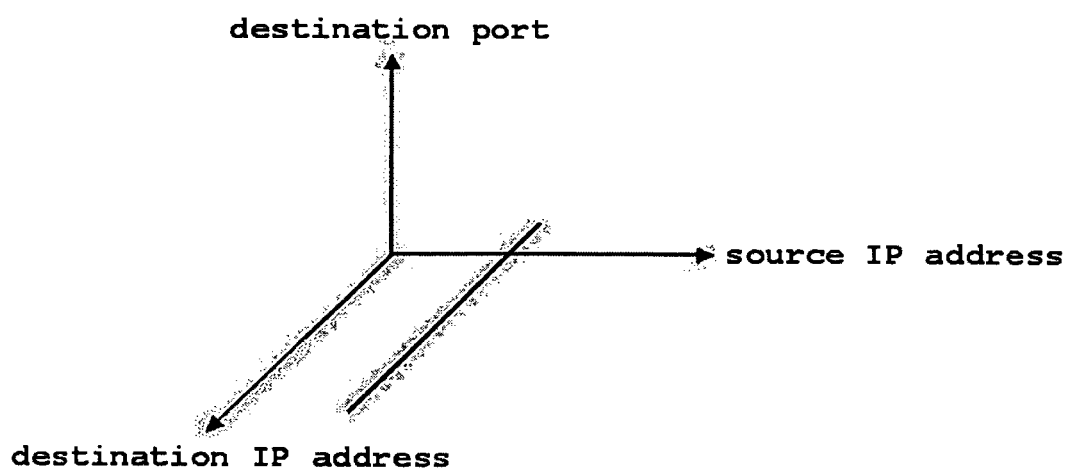
FIG. 5 is a graph showing the host scanning attack of FIG. 4.

In FIG. 4, the network status display unit 105 analyzes the provided coordinate point data and determines whether the source IP address and the destination port number are fixed and the destination IP address is variable at step 601. If the source IP address and the destination port number are fixed and the destination IP address is variable as shown in FIG. 5, the attack type is determined to be a host scanning attack at step 603. If it is not determined that the source IP address and the destination port number are fixed and the destination. IP address is variable at step 601, it is determined whether the source IP address and the destination IP address are fixed and the destination port number is variable at step 605.

Figure 6:
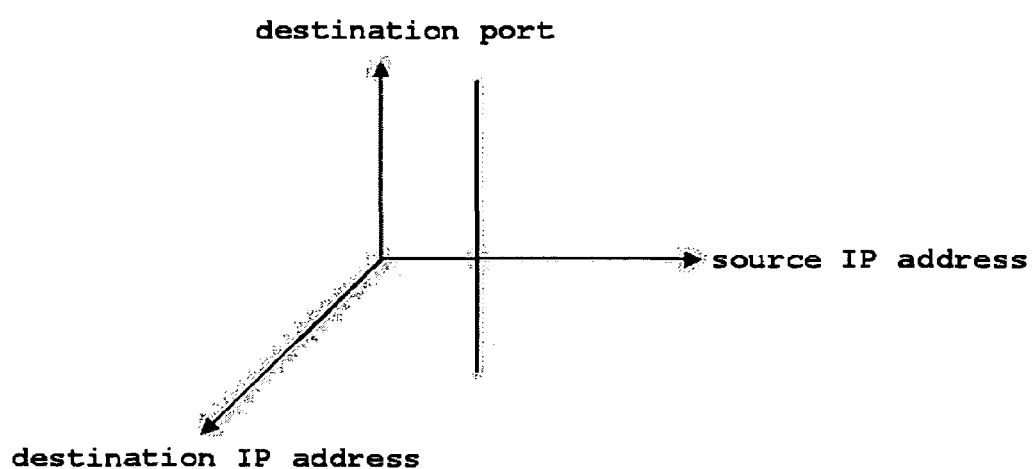
FIG. 6 is a graph showing the port scanning attack of FIG. 4.

If it is determined that the source IP address and the destination IP address are fixed and the destination port number is variable as shown in FIG. 6 at step 605, the attack type is determined to be a port scanning attack at step 607. If it is not determined that the source IP address and the destination IP address are fixed and the destination port number is variable, the process proceeds to step 609.

Figure 7:
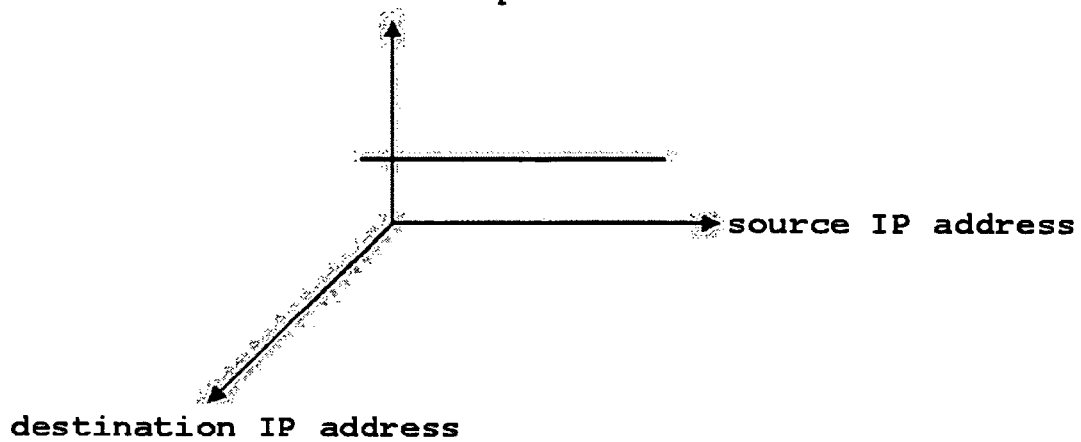
FIG. 7 is a graph showing the source-spoofed Denial of Service (DoS) attack on the specific port of a specific destination IP address of FIG. 4.

It is determined whether the source IP address and the destination port number are fixed and the destination IP address is variable at step 609. If it is determined that the source IP address and the destination port number are fixed and the destination IP address is variable as shown in FIG. 7, the attack type is determined to be a source-spoofed DoS attack on the specific port of a specific destination IP address at step 611.

Figure 8:
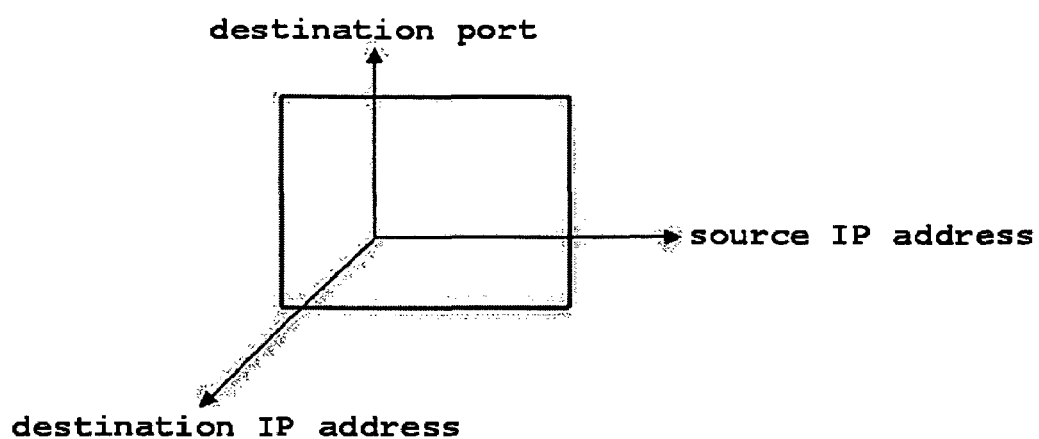
FIG. 8 is a graph showing the source-spoofed DoS attack on a specific destination IP address of FIG. 4.

Meanwhile, if it is not determined that the source IP address and the destination port number are fixed and the destination IP address is variable at step 609, the process proceeds to step 613. It is determined whether the destination IP address is fixed and the source IP address and the destination port number are variable at step 613. If the destination IP address is fixed and the source IP address and the destination port number are variable as shown in FIG. 8, the attack type is determined to be a source-spoofed DoS attack on a specific destination IP address at step 615.

When the determination of the attack type is completed through the above-described steps, the process proceeds to step 700 and copes with the abnormal situation of the network.

FIG. 9 is a diagram showing the construction of an apparatus for displaying network status according to a second embodiment of the present invention.

Referring to FIG. 9, the apparatus for displaying network status according to the second embodiment of the present invention includes a network traffic collection unit 101, an attack signature generation unit 107 and a second attack type determination unit 109. The network traffic collection unit 101 is the same as described in the first embodiment of the present invention.

The attack signature generation unit 107 receives connection information on packets transmitted from the network traffic collection unit 101, determines whether the elements of the connection information, that is, the source IP addresses, the destination IP addresses and the destination port numbers, match the corresponding elements of connection information on packets that are collected during a period between a collection time of the transmitted packets and a time before an extraction period ends, and generates attack signatures for displaying whether the elements of the transmitted packets matching the corresponding elements exist.

That is, in consideration of the fact that the three elements of the connection information on the packets, which constitute an attack, form a specific geometric shape, such as a line or plane, on the network status display unit 103 according to the first embodiment of the present invention, the attack signature generation unit 107 represents the fact that the three elements of the connection information will contribute to the generation of the specific geometric shape as an attack signature on each packet.

Hereinafter, connection information, which has a source IP address Is, a destination IP address Id, a destination port number Pd, is represented by [Is, Id, Pd], and an attack signature, which has a bit Bs indicating whether a matched source IP address exists, a bit Bd indicating whether a matched destination IP address exists and a bit Bp indicating whether a matched destination port number exists, is represented by {Bs, Bd, Bp} (a bit indicating the existence of a matched one is "1" and a bit indicating the absence of a matched one is "0"). A principle of generating the attack signature is described using an example below.

In the case where an extraction period is two units, connection information on a packet whose collection time is "t" is [3.4.5.6, 5.6.7.8, 90], connection information on a packet whose packet collection time is "t+1" is [1.2.3.4, 5.6.7.8, 80] and connection information on a packet whose packet collection time is "t+2" is [1.2.3.4, 3.4.5.6, 90]. The attack signature of the packet whose packet collection time is "t+2" is described below.

The attack signature of the packet whose packet collection time is "t+2" is {1,0,1}. The reason for this is that the source IP address of the packet whose collection time is "t+2" matches that of the packet whose packet collection time is "t+1," the destination IP address thereof does not match any packets, and the destination port number matches that of the packet whose packet collection time is "t."

Meanwhile, the second attack type determination unit 109 analyzes attack signatures generated as described above, and determines the attack type of the packets according to the types of attack signatures.

The second attack type determination unit 109 estimates that a packet having an attack signature {1,0,1} is a packet constituting a host scanning attack in which a source IP address and a destination port number are fixed and a destination IP address is variable, and examines the packet in more detail as described later.

The reason for the detailed examination is that, since normal packets can be interposed between and mixed with packets constituting abnormal attacks, a normal packet can have a attack signature {1,0,1} if, as a result of comparison, the source IP address and destination port number of the normal packet accidentally match those of the packets constituting the abnormal attacks, and the destination IP address of the normal packet does not match those of the packets constituting the abnormal attacks.

In detail, the second attack type determination unit 109 compares the elements of the connection information on the packet having the attack signature {1,0,1} with corresponding elements of the connection information of packets that are collected during a period between the collection time of the packet and a time ahead of the collection time by a predetermined period, and determines the attack type to be the host scanning attack if the number of the packets, in which source IP addresses and the destination port numbers are fixed and the destination IP addresses are variable, is greater than a predetermined number.

Furthermore, the second attack type determination unit 109 estimates that a packet whose attack signature is {1,1,0} is a packet constituting a port scanning attack in which a source IP address and a destination IP address are fixed and a destination port number is variable.

The second attack type determination unit 109 compares the elements of connection information on the packet with the corresponding elements of connection information on packets that are collected between the collection time of the packet and a time ahead of the collection time by a predetermined period, and determines the attack type to be a port scanning attack if the number of the packets, in which the source IP addresses and the destination IP addresses are fixed and the destination port numbers are variable, is greater than a predetermined number.

Furthermore, the second attack type determination unit 109 estimates that a packet whose attack signature is {0,1,1} is a packet constituting a source-spoofed DoS attack on the specific port of a specific destination IP address in which the destination IP address and the destination port number are fixed and the source IP address is variable.

The second attack type determination unit 109 compares the elements of connection information of the packet with the corresponding elements of connection information on packets that are collected between the collection time of the packet and a time ahead of the collection time by a predetermined period, and determines the attack type to be a source-spoofed DoS attack on the specific port of a specific destination IP address in which the destination IP address and the destination port number are fixed and the source IP address is variable.

Furthermore, the second attack type determination unit 109 estimates that a packet whose attack signature is {0,1,0} is a packet constituting a source-spoofed DoS attack on a specific destination IP address in which the destination IP address is fixed and the source IP address and the destination port number are variable.

The second attack type determination unit 109 compares the elements of the connection information of the packets with the corresponding elements of the connection information of packets that are collected between the collection time of the packet and a time ahead of the collection time by a predetermined period, and determines the attack type to be a source-spoofed DoS attack on a specific destination IP address in which the destination IP address is fixed and the source IP address and the destination port number are variable.

As described above, it is easy to determine the abnormal status on a network because current network traffic situation can be represented by a three-dimensional rectangular coordinate system or by attack signatures, and a processing time required to determine an attack type is reduced because scanning attacks and source-spoofed DoS attacks are determined using only connection information on packets, so that the present invention is effective in that it is easy to apply to a high-speed network, response to the abnormal status is quick, and accuracy of the detection of the attack type is improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for displaying network status, comprising:
a network traffic collection unit for analyzing packets collected from an external communication network and outputting connection information including source Internet Protocol (IP) addresses, destination IP addresses and destination port numbers;
a network status display unit for receiving the connection information transmitted from the network traffic collection unit for a predetermined period and displaying the connection information in a coordinate point data form on a three-dimensional rectangular coordinate system whose three axes are assigned to a source IP address, a destination IP address and a destination port number, respectively; and
a first attack type determination unit for detecting the coordinate point data displayed on the network status display unit as a line or plane through image processing and determining an attack type according to a type of the line or plane.

2. The network status display apparatus as set forth in claim 1, wherein the first attack type determination unit determines the attack type to be a host scanning attack if the source IP address and the port number are fixed and the destination IP address is variable, so that the coordinate point data are displayed as a line on the three-dimensional rectangular coordinate system.

3. The network status display apparatus as set forth in claim 1, wherein the first attack type determination unit determines the attack type to be a port scanning attack if the source IP address and the destination IP address are fixed and the destination port number is variable, so that the coordinate point data are represented by a line on the three-dimensional rectangular coordinate system.

4. The network status display apparatus as set forth in claim 1, wherein the first attack type determination unit determines the attack type to be a source-spoofed Denial of Service (DoS) attack on a specific port of a specific destination IP address if the specific destination port number and the specific destination IP address are fixed and the source IP address is variable, so that the coordinate point data are represented by a line on the three-dimensional rectangular coordinate system.

5. The network status display apparatus as set forth in claim 1, wherein the first attack type determination unit determines the attack type to be a source-spoofed DoS attack on a specific destination IP address if the specific destination IP address is fixed and the source IP address and the specific destination poll number are variable, so that the coordinate point data are represented by a plane on the three-dimensional rectangular coordinate system.

6. An apparatus for displaying network status, comprising:
a network traffic collection unit for analyzing packets collected from an external communication network and outputting connection information formed of elements including source IP addresses, destination IP addresses and destination port numbers;
a first attack type determination unit for detecting the coordinate point data displayed on the network status display unit as a line or plane through image processing and determining an attack type according to a type of the line or plane.
an attack signature generation unit for receiving the connection information on a packet transmitted from the network traffic collection unit, determining whether the elements of the connection information match corresponding elements of connection information on packets that are collected during a period between a collection time of the transmitted packet and a time ahead of the collection time by a predetermined period, and generating an attack signature for indicating whether the elements of the transmitted packet matching the corresponding elements exist; and
a second attack type determination unit for analyzing the attack signature of the packet and determining an attack type of the packet according to the attack signature.

7. The apparatus as set forth in claim 6, wherein the second attack type determination unit compares elements of connection information on a packet, which has an attack signature in which a source IP address and a destination port number are indicated as matching and the destination IP address is indicated as not matching, with corresponding elements of connection information on the packets that are collected during a period between a collection time of the packet and a time ahead of the collection time by a predetermined period, and determines the attack type to be a host scanning attack if a number of the packets, in which the source IP addresses and the destination port numbers are fixed and the destination IP addresses are variable, is greater than a predetermined number.

8. The apparatus as set forth in claim 6, wherein the second attack type determination unit compares elements of connection information on a packet, which has an attack signature in which the source IP address and destination IP address are indicated as matching and the destination port number is indicated as not matching, with corresponding elements of connection information on packets that are collected during a period between a collection time of the packet and a time ahead of the collection time by a predetermined period, and determines the attack type to be a port scanning attack if a number of the packets, in which the source IP addresses and the destination IP addresses are fixed and the destination port numbers are variable, is greater than a predetermined number.

9. The apparatus as set forth in claim 6, wherein the second attack type determination unit compares elements of connection information on a packet, which has an attack signature in which the destination IP address and destination port number are indicated as matching and the source IP address is indicated as not matching, with corresponding elements of connection information on packets that are collected during a period between a collection time of the packet and a time ahead of the collection time by a predetermined period, and determines the attack type to be a source-spoofed DoS attack on a specific port of a specific destination IP address if a number of the packets, in which the destination IP addresses and the destination port numbers are fixed and the source IP addresses are variable, is greater than a predetermined number.

10. The apparatus as set forth in claim 6, wherein the second attack type determination unit compares elements of connection information on a packet, which has an attack signature in which the destination IP address is indicated as matching and the source IP address and the destination port number are indicated as not matching, with corresponding elements of connection information on packets that are collected during a period between a collection time of the packet and a time ahead of the collection time by a predetermined period, and determines the attack type to be a source-spoofed DoS attack on a specific port of a specific destination IP address if a number of the packets, in which the destination IP addresses are fixed and the source IP addresses and the destination port numbers are variable, is greater than a predetermined number.

* * * * *